US008767672B2

(12) United States Patent
Soomro et al.

(10) Patent No.: US 8,767,672 B2
(45) Date of Patent: Jul. 1, 2014

(54) SYSTEM, APPARATUS, AND METHOD TO INDICATE PREFERRED ACCESS POINTS AND SERVICE PROVIDERS

(75) Inventors: Amjad Soomro, Hopewell Junction, NY (US); Dave A. T. Cavalcanti, Ossining, NY (US)

(73) Assignee: Koninklijke Philips N.V., Eindhoven (NL)

( * ) Notice: Subject to any disclaimer, the term of this patent is extended or adjusted under 35 U.S.C. 154(b) by 1008 days.

(21) Appl. No.: 12/302,090

(22) PCT Filed: May 23, 2007

(86) PCT No.: PCT/IB2007/051950
§ 371 (c)(1),
(2), (4) Date: Nov. 24, 2008

(87) PCT Pub. No.: WO2007/138530
PCT Pub. Date: Dec. 6, 2007

(65) Prior Publication Data
US 2011/0205910 A1 Aug. 25, 2011

Related U.S. Application Data

(60) Provisional application No. 60/809,475, filed on May 30, 2006.

(51) Int. Cl.
H04W 4/00 (2009.01)
H04W 80/04 (2009.01)
H04W 64/00 (2009.01)
(52) U.S. Cl.
CPC .................. H04W 80/04 (2013.01); H04W 64/00 (2013.01)
USPC ........................ 370/331; 455/456.1
(58) Field of Classification Search
USPC ......... 370/230, 328, 331, 332, 335, 338, 342, 370/401; 455/432.1, 433, 435.1–440, 455/456.1, 456.2, 456.3
See application file for complete search history.

(56) References Cited

U.S. PATENT DOCUMENTS 7,158,484 B1 * 1/2007 Ahmed et al. ................ 370/254
7,480,507 B2 * 1/2009 Kuroda .......................... 455/433
(Continued)

FOREIGN PATENT DOCUMENTS

EP 0781005 A1 6/1997
EP 0888026 A2 12/1998
(Continued)

OTHER PUBLICATIONS

"802.11K", Network World, Mar. 29, 2004, XP002457506 URL:http://www.networkworld.com/details/6858.html?def>.

*Primary Examiner* — Phuongchau B Nguyen
(74) *Attorney, Agent, or Firm* — Larry Liberchuk (57) ABSTRACT

The present invention is a system, apparatus, and method for a "Priority" field that is included in the information transmitted by an Access Point (AP) ($801_i$) about its neighbor APs ($801_i$) and the network service providers (SPs) that it supports. A "Priority" field ($103_i$-6 $154_i$.2 $203.i.2$ $233$ $266$) is included in at least one of a Neighbor Report element (100), an AP Channel Report element (150), and a service provider's information element (200 230 260). The service provider priority field ($203.i.2$ $233$ $266$) is contained in any protocol frame transmitted by the AP ($801_i$) that contains information about one or more service providers that it supports. The "Priority" field ($103_i$.6 $154-_i$.2 $203.i.2$ $233$ $266$) contains a numeric value or a symbolic indicating a recommendation from the AP ($801_i$) concerning which AP/APs and service provider(s) SP/SPs for a STA ($802_j$) to scan first or access in an eventual roaming/accessing process. For roaming/accessing purposes, more than one neighboring AP ($801_i$) can have the same priority value and not all the APs ($801_i$) that are neighbors or support SPs necessarily have the same priority value.

20 Claims, 8 Drawing Sheets

(56) References Cited

U.S. PATENT DOCUMENTS

| | | | |
|---|---|---|---|
| 7,894,823 B2 * | 2/2011 | Alemany et al. | 455/453 |
| 7,974,620 B1 * | 7/2011 | Singh et al. | 455/432.1 |
| 2003/0017838 A1 * | 1/2003 | Kayama et al. | 455/525 |
| 2004/0146021 A1 | 7/2004 | Fors | |
| 2004/0166858 A1 | 8/2004 | Masuda | |
| 2004/0224690 A1 | 11/2004 | Choi | |
| 2005/0136892 A1 * | 6/2005 | Oesterling et al. | 455/411 |
| 2005/0141468 A1 | 6/2005 | Kim | |
| 2005/0148332 A1 | 7/2005 | Buckley | |
| 2011/0205910 A1 * | 8/2011 | Soomro et al. | 370/252 |

FOREIGN PATENT DOCUMENTS

| | | |
|---|---|---|
| EP | WO2005122607 A2 | 12/2005 |
| WO | WO2004054283 A2 | 6/2004 |
| WO | WO2005048074 A2 | 5/2005 |
| WO | WO2005122601 A2 | 12/2005 |
| WO | WO 2006/119573 A1 * 11/2006 ............... H04L 12/66 |

* cited by examiner

FIG. 1A

| Element ID 101 | Length 102 | Neighbor List Entry (variable) 103ᵢ | | | | | |
|---|---|---|---|---|---|---|---|
| | | BSSID 103ᵢ.1 | BSSID Information 103ᵢ.2 | Channel Number 103ᵢ.3 | Regulatory Class 103ᵢ.4 | PHY Options 103ᵢ.5 | TSF Information 103ᵢ.6 | Priority 103ᵢ.6 |
| 1 | 1 | 6 | 2 | 1 | 1 | 1 | 4 | 1 |

| Element ID 151 | Length 152 | Regulatory Class 153 | Channel List Entry (variable) 154ᵢ | |
|---|---|---|---|---|
| | | | Channel number 154ᵢ.1 | Priority 154ᵢ.2 |
| 1 | 1 | 1 | 1 | 1 |

150

200 →

| Element ID 201 | Length 202 | Service Providers Information (Variable length) 203 | | | | | | |
|---|---|---|---|---|---|---|---|---|
| | | 203.1.1 SP1 Info | 203.1.2 Priority for SP1 | 203.2.1 SP2 Info | 203.2.2 Priority for SP2 | ... | 203.N.1 SPN Info | 203.N.2 Priority for SPN |
| Octets: 1 | 1 | variable | 1 | variable | 1 | | variable | 1 |

| Element ID 231 | Length 232 | Priority 233 | SPs Information (Variable) 234 | | | |
|---|---|---|---|---|---|---|
| | | | 234.1 SP1 Info | 234.2 SP2 Info | ... | 234.N SPN Info |
| Octets: 1 | 1 | 1 | variable | variable | | variable |

| Element ID 261 | Length 262 | Measurement Token 263 | Measurement Report Mode 264 | Measurement Type 265 | Measurement Report (includes info for Sps and SP priority) 266 |
|---|---|---|---|---|---|
| Octets: 1 267 | 1 | 1 | 1 | 1 | variable |

FIG. 2C

| BSSID 103ᵢ.1 | BSSID Information 103ᵢ.2 | Channel Number 103ᵢ.3 | Regulatory Class 103ᵢ.4 | PHY Options 103ᵢ.5 | TSF Information 103ᵢ.6 | Priority 103ᵢ.6 |
|---|---|---|---|---|---|---|
| 6 | 2 | 1 | 1 | 1 | 4 | 1 |
|  |  |  |  |  |  |  |
|  |  |  |  |  |  |  |

300

Neighbor List Entries (variable) 103ᵢ

FIG. 3A

| Channel number 154ᵢ.1 | Priority 154ᵢ.2 |
|---|---|
| 1 | 1 |
|  |  |
|  |  |

350

Channel List Entries (variable) 154ᵢ

SYSTEM, APPARATUS, AND METHOD TO INDICATE PREFERRED ACCESS POINTS AND SERVICE PROVIDERS

FIELD OF THE INVENTION

The present invention relates to a system, apparatus and method for prioritizing access points (APs) and/or service providers (SPs) for preferred connectivity thereto by a station (STA) in a wireless network.

BACKGROUND OF THE INVENTION

The support of access to STA-selected APs is a general requirement in any wireless system where the mobile stations access the network through APs or base stations, and for many real time based applications, any delay in the access process may degrade the quality of the service. The problem of minimizing the access delay remains a major challenge for most wireless system designers. One of the main issues is the limited ability of the mobile stations in discovering and maintaining network state information for use in optimization of the AP selection procedure. This problem is compounded by the STAs' need to have information about the service providers supported by an AP and/or neighboring APs in choosing an AP to access.

Handoffs between wireless local area networking (WLAN) technologies and cellular technologies such as 2G/3G/4G GSM, CDMA, TDMA etc., are taking on increasing significance because connectivity through WLANs increases cellular coverage area. It is also attractive since WLAN technologies are un-licensed thus have: 1) low cost; 2) the potential to provide higher data rates; and 3) ability to provide quality of service (QoS) for multimedia applications.

In IEEE 802.11 wireless networks, information about neighboring APs and the service providers supported is included in beacons, which are transmitted at least at one of fixed and predetermined intervals of time as well as in probe responses and measurement reports. The measurement reports can be initiated by request from a STA or they can be generated autonomously. Furthermore, some other channels being used by neighboring APs, AP capability and supported service provider information can be conveyed to STAs in response to probe requests.

The information about SPs helps a STA to find an SP through an AP for handover or to establish a connection through a WLAN without any prior connection in less time. The information about neighbor APs operating in other channels helps a STA minimize the time it takes the STA to locate a candidate AP for roaming Reducing roaming delay is fundamental to lessen packet losses and support seamless connectivity, which is a key requirement for several applications like video, voice, critical patient monitoring including legacy data applications.

According to the proposed methods in the IEEE 802.11k draft D2.0 amendment, an AP can transmit a list of valid channels and a list of APs in its neighborhood along with some of their capabilities to help STAs to find a candidate AP for roaming. Though this information helps a STA to not arbitrarily scan channels or to look for APs that may not have the capabilities the STA expects, the list may have more than one channel or neighbor AP indicated which may increase scanning delay to find the right AP candidate to roam to. Thus, a STA would have to switch to each channel in the list and/or inquire each AP in the neighbor report element via probe request or via some other measurements such as received signal strength to find the right AP.

According to the proposed methods in the IEEE 802.11 TGu, an AP can transmit a list of SPs along with some of their capabilities to help STAs find a suitable SP to connect to. Though this information helps a STA to not inquire of an AP for one or more SPs that it could/would want to connect to, the list may have more than one SP, and, therefore, a STA would have to look at additional parameters such as the associated costs, the communication parameters, the security/authentication parameters, the type of service supported, etc., to select an SP to connect to. A complete list of all possible parameters of interest to STAs would use prohibitively large communication frames and time, thus reducing the efficiency of the communication protocol for data transmission.

Thus, there is a need in the art to describe the relative merits of the APs and SPs in a compact manner, for example, due to associated costs, level of integration of the AP services with the SP's, priority assigned to the traffic coming from and going to the SP, priority assigned by the AP to honor requests for connection with a particular SP, number and types of services offered when connected to a particular SP, etc. This need includes a need in the art to lessen the time to find the right channel and/or AP amongst the neighbor APs or amongst the regulatory valid channels, and/or to find the right SP to connect to.

SUMMARY OF THE INVENTION

For roaming, the present invention reduces the delay in this discovery phase and contributes to a decrease in the overall roaming delay, avoiding packet loss and waste of energy by the STAs. Therefore, mechanisms to minimize the discovery delay are a key feature of the present invention and contribute to optimizing roaming performance. Furthermore, the present invention takes network load considerations and QoS requirements into account by preferring for a STA to roam to a neighbor AP that is able to better support the QoS requirements.

The currently available mechanisms for minimizing discovery delay include channel lists and neighbor lists that do not allow a STA to differentiate between candidates, nor do these existing mechanisms provide enough information for the STAs to decide which is the best candidate AP or which AP to associate with first. The best channel and/or AP candidate for a given STA depends on several factors, such as relative position between the STA and the currently available APs and traffic load at the currently available APs, and this information is provided and used by the present invention so that an AP provides an indication of the channel and/or AP that is more appropriate for roaming at a given location and time.

The present invention is a system, apparatus, and method for a "Priority" field that is included in the information transmitted by an AP about its neighbor APs and/or service providers (SPs) it supports.

In a first embodiment, a "Priority" field is included in at least one of a Neighbor Report element and an AP Channel Report element. The "Priority" field contains a numeric value or a symbol indicating a recommendation from the AP concerning which AP/APs to scan first or to attempt to roam to in an eventual roaming process. More than one neighboring AP can have the same priority value and not all the APs that are neighbors necessarily have the same priority value.

In a second embodiment, a "Priority" field is included in protocol frames transmitted by AP containing the information about the SPs that it supports. The priority field contains a numeric value or a symbol assigned to each SP indicating relative recommendation from the AP about which SPs are considered preferable by it for connection thereto. More than one SP can have the same priority value and not all the SP necessarily have the same priority value.

An AP can generate the priority values for SPs based on, for example, associated costs to the end user or to itself, the level of integration of the AP services with the SP's, the priority assigned to the traffic coming from and going to the SP, the priority assigned by the AP to honor requests for connection with a particular SP, the number of services offered when connected to a particular SP, the business contracts or any other pre-determined parameter that affects the quality and/or cost to a STA of connecting to an SP and using the services provided thereby.

The level of integration is determined by the nature of the business contracts that an AP provider has with the network SP. It could also be determined by the technical integration of the services of the AP services with the SP network, for example, high bandwidth connections, authentication/encryption support, QoS support, and enforced service level agreements.

With the priority indicated by an AP for SPs, a STA then tries to establish a connection with an SP having a highest indicated priority first, although the STA ultimately determines how to take into account the priorities provided by the AP when establishing a connection to an SP. Therefore, the AP and STA both gain by establishing a connection to the preferable SPs. A STA gains by having more access to the services, better QoS, better cost/value, better chance of admission, reliable/guaranteed service etc. An AP gains by having more STAs using services that it is better equipped to handle, has more profit potential, provides more user satisfaction, provides better QoS, etc.

An AP has access to the capabilities and requirements of the STA, as well as the network configuration and state. Therefore, AP is in better position to indicate preference based upon this knowledge which contributes further to the benefits already described that accrue as a result of the present invention.

DETAILS OF THE INVENTION

The present invention can be readily understood by one skilled in the art in view of the following detailed description with reference to the accompany drawings presented for only illustrative purposes. In the drawings, the same reference symbol denotes identical components in order to eliminate redundant description thereof.

The system, apparatus, and method of the present invention provide a "Priority" field having a priority value in information transmitted by an AP about its neighboring APs and/or service providers (SPs). In a first embodiment, referring to FIGS. 1A and 1B, a respective "Priority" field 102.6 and 154.2 is included in a Neighbor Report element 100 and AP Channel Report element 150. The "Priority" field preferably contains a numeric or symbolic value indicating a recommendation from the transmitting AP to a receiving STA about which AP/APs to scan first in an eventual roaming process. More than one AP may have the same priority value and not all the APs necessarily have the same priority value.

In a preferred first embodiment an AP generates these priority values based on the load information of the neighbor APs, location of the requesting STA, ability of the APs to accept new connections and to accept connections with QoS requirements, among other parameters.

Figure 1A:
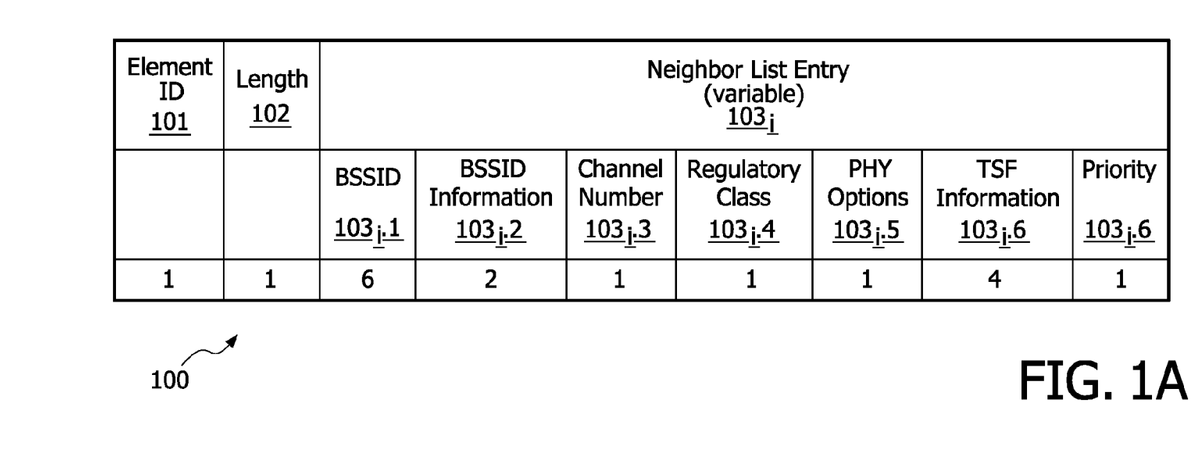
FIG. 1A illustrates a neighbor report element format according to the present invention.
Figure 1B:
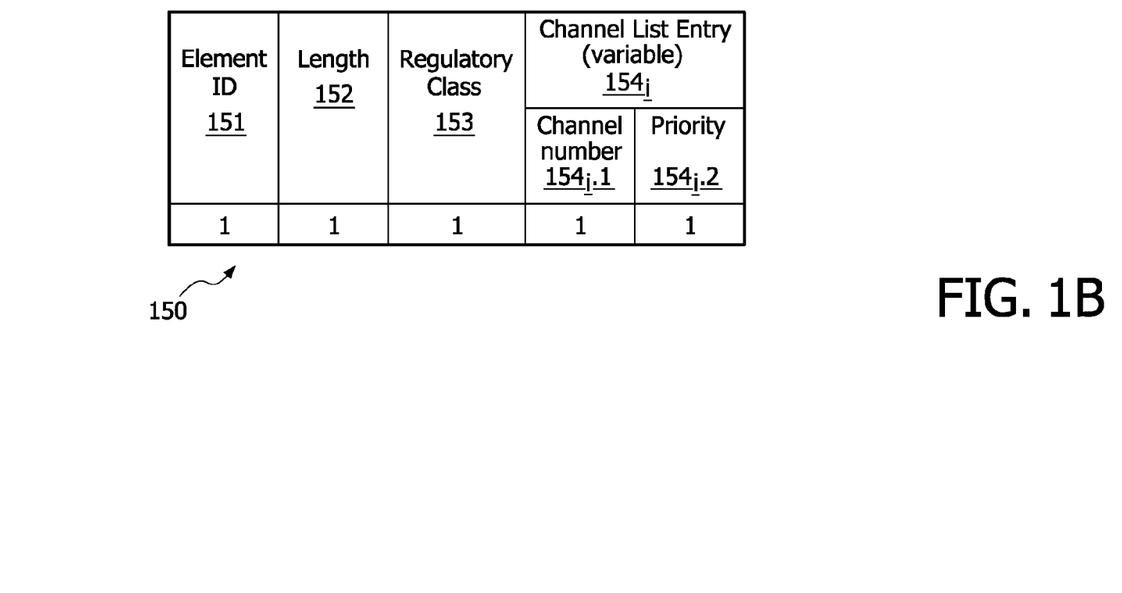
FIG. 1B illustrates a channel report element format according to the present invention.

Given the priority value 103.6 154.2 respectively indicated in a Neighbor report 100 and in an AP Channel Report element 150, a STA then scans a local prioritized list of neighboring APs and tries to establish a connection with the AP of the highest indicated priority first. As a result, the delay in the scan and discovery process for finding the right AP is reduced. Also, energy consumption is reduced, by avoiding scanning APs that are not within the coverage of the STA, that cannot support the STA's QoS requirements, and that cannot support a SP that the STA wants to connect to.

An AP has knowledge of the capabilities and requirements of the STA as well as the network configuration and state. An AP has knowledge of the SPs that it supports. Therefore, the AP is in a better position to indicate a preference based upon its knowledge and also reduces scan times considerably.

The "Priority" field 103.6 154.2 is also used to reduce the delay in roaming between different networks, which is called vertical handoff. For instance, roaming between cellular systems and WLAN hot spots is an important functionality for service providers in wireless networks. In this scenario, a mobile STA equipped with cellular and WLAN interfaces is able to switch an ongoing connection from the cellular interface to the WLAN interface and vice versa, depending on the availability of coverage, QoS support, and cost. Minimizing the roaming delay in this scenario is also a fundamental issue, and the priority information computed by the APs and base stations allows the mobile STAS to roam at the right time and to the best AP or base station.

In a first preferred embodiment, a "Priority" field 103.6 is included in each neighbor list entry in a neighbor report element 100. FIG. 1A illustrates an exemplary size in octets for one neighbor list entry 103 and the neighbor report element 100 may contain a variable number of neighbor list entries 103.

Alternatively, the priority value information is included in an AP channel report element 150. In this alternative embodiment, a variable number of channel list entries 204 are included in the channel report 150 and each entry 154 preferably consists of two fields, the channel number 154.1 and the relative "Priority" value 154.2 (see FIG. 1B).

Figure 3A:
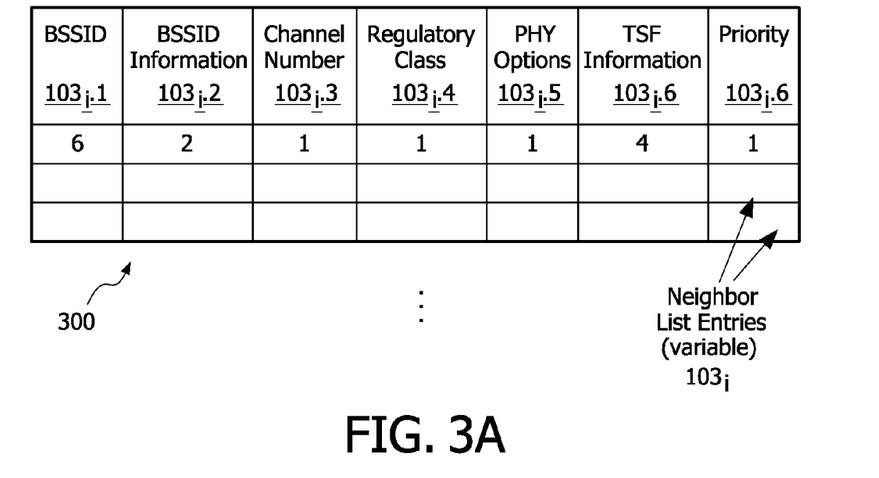
FIG. 3A illustrates a local STA neighbor list of prioritized AP roaming candidates according to the present invention.
Figure 3B:
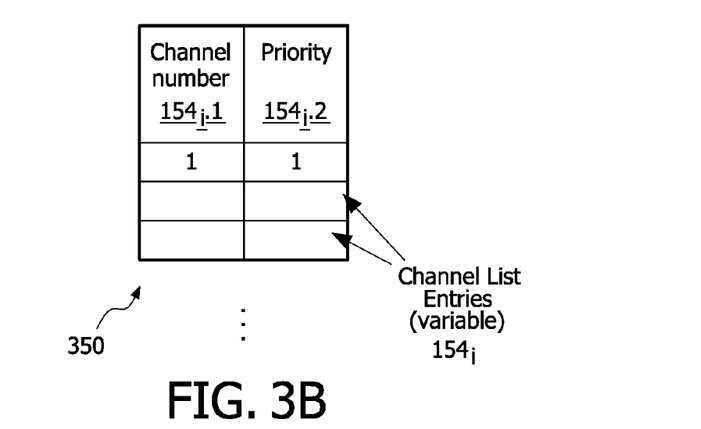
FIG. 3B illustrates a local STA Channel list of prioritized AP roaming candidates according to the present invention.
Figure 4:
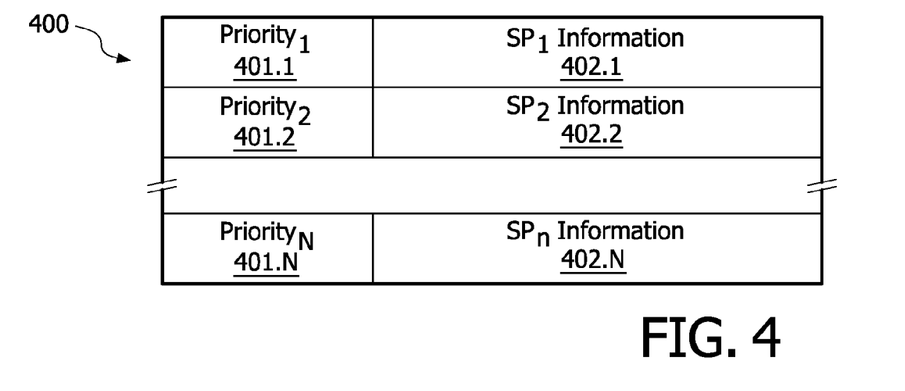
FIG. 4 illustrates a local STA SP list of prioritized service providers.

The "Priority" field 154.2 indicates the recommended relative priority of the corresponding BSSID for roaming purposes or scanning for that channel, in an embodiment of an AP Channel report 150. Referring now to FIGS. 3 and 4, respectively, upon receiving a neighbor report response 100 or an AP channel report 150, each STA updates its AP candidate list 300 and/or channel candidate list 400 for roaming. Then the STA preferably selects the highest priority candidate in case of a roaming decision.

Figure 2A:
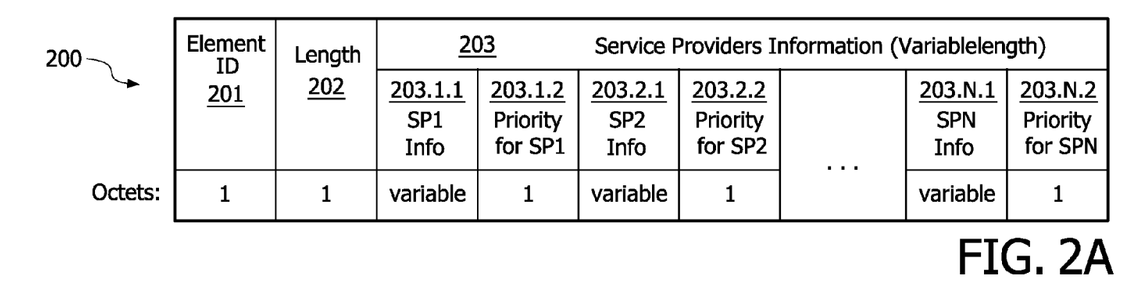
FIG. 2A illustrates an Information Element comprising SPs' information and priority fields.
Figure 2B:
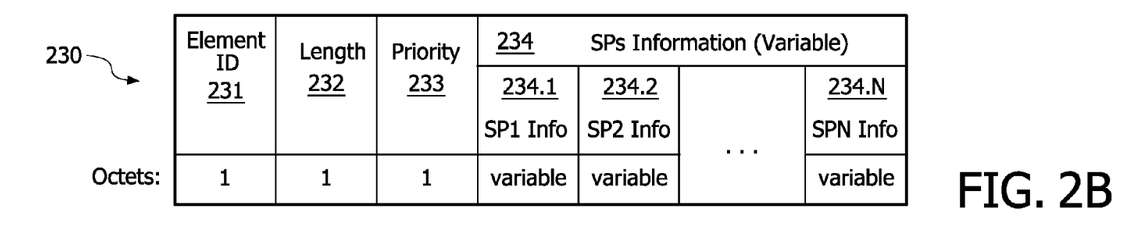
FIG. 2B illustrates an Information Element with a single priority field for all SPs.
Figure 2C:
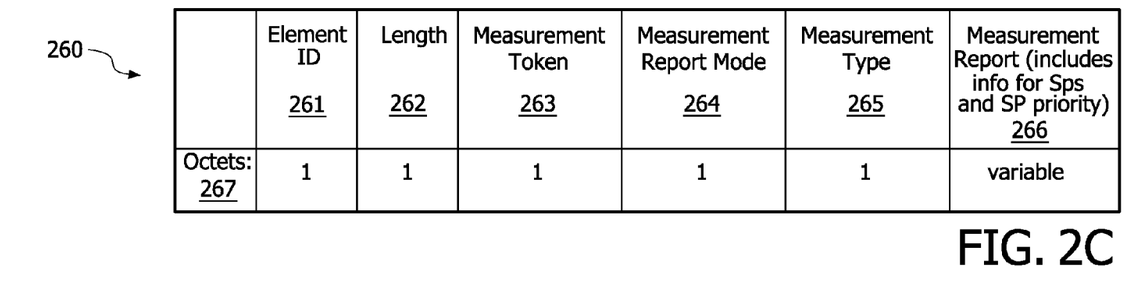
FIG. 2C illustrates a Measurement Report Element format that includes information for SPs and their priorities.

Turning now to FIGS. 2A-C for service providers (SPs) supported by an AP, in a second embodiment, priority fields are included in an Information Element 200 that carries information about these SPs to indicate its preference of SP(s) with respect to zero or more other SPs. The priority-inclusive 203.*i*.2 frames 200 are preferably transmitted within a frame selected from the group consisting of beacon frame and non-beacon frame. In a preferred alternative of the second embodiment the non-beacon frame is a Probe Response.

FIG. 2A illustrates an example of a format for the Information Element 200 that carries information 203 about 'N' SPs 203.*i*.1 203.*i*.2. A variable number of SPs can be advertised by an AP using this Information Element 200.

As shown in FIG. 2A, a priority field 203.*i*.2 is associated with each SP in the Information Element 200. In this second embodiment, the priority field 203.*i*.2 is left 'undefined' whenever the priority of an SP cannot be established or if it desired not to populate the priority field. In a preferred embodiment, the priority field length of the Information Element 200 is selected from the group consisting of a 1-octet length field, as indicated in FIG. 2A, and a length denoted by S>1-octect, which is configured by a network operator.

Referring now to FIG. 2B, in an alternative second embodiment, the priority information 233 is associated with multiple SPs such that an AP uses a single priority field 233 to indicate its preference with respect to several SPs. In this alternative, the Information Element 230 shown in FIG. 2B includes a single priority field 231. The single priority field 233 depicted in FIG. 2B can represent a priority threshold for all SPs included in the Information Element 230. In this case, an Information Element 230 with priority field 233 set to a given value, says P, includes information about SPs whose associated priorities are greater or equal to P. This allows the AP to advertise a sub-set of the supported SPs that have higher priority, while other lower SPs are not advertised. The Information Element shown in FIG. 2B is transmitted in beacons, probe responses and measurement reports. It is important to remark that the priority field size set to 1 octet in FIG. 2B is a possible design choice and is an example only. Other sizes can be used as well as.

In a further alternative, the priority field 233 is defined as a priority interval [a, b], where a, b are real numbers to indicate that the SPs advertised 232 in the Information Element with priority [a, b], for example, have priorities within the corresponding closed interval [a, b].

FIG. 2C illustrates a Measurement Report Element 260 for 802.11 WLANs. In a third embodiment, a priority field is added to any measurement report 260 that carries information about SP's and that is used in network discovery or roaming procedures. In this third embodiment, the information about the SPs supported by the AP, including corresponding priority fields, is transmitted in a Measurement Report field 266 of the Measurement Report Element 260. There can be a single priority for all SPs supported by the AP or a priority specific to each SP supported by the AP.

A measurement report is requested by a STA through a measurement report request and STAs can request a measurement report with information about service providers from one or more APs.

In an alternative third embodiment, the information element with SPs' information and priority fields is transmitted in a Measurement Report that also includes other types of measurements that have been requested by the STA. For instance, the information about SPs and priorities is transmitted together with a report selected from the group consisting of Neighbor Report and Channel Report of the first embodiment. This alternative embodiment provides additional information for the STA to use in deciding which AP to select in a roaming procedure or when it is trying to establish a WLAN connection.

In all embodiments of the present invention, measurement reports and probe responses are transmitted by an AP upon request by a STA and autonomously by an AP without receiving a request from one or more STAs to transmit such information.

Figure 5:
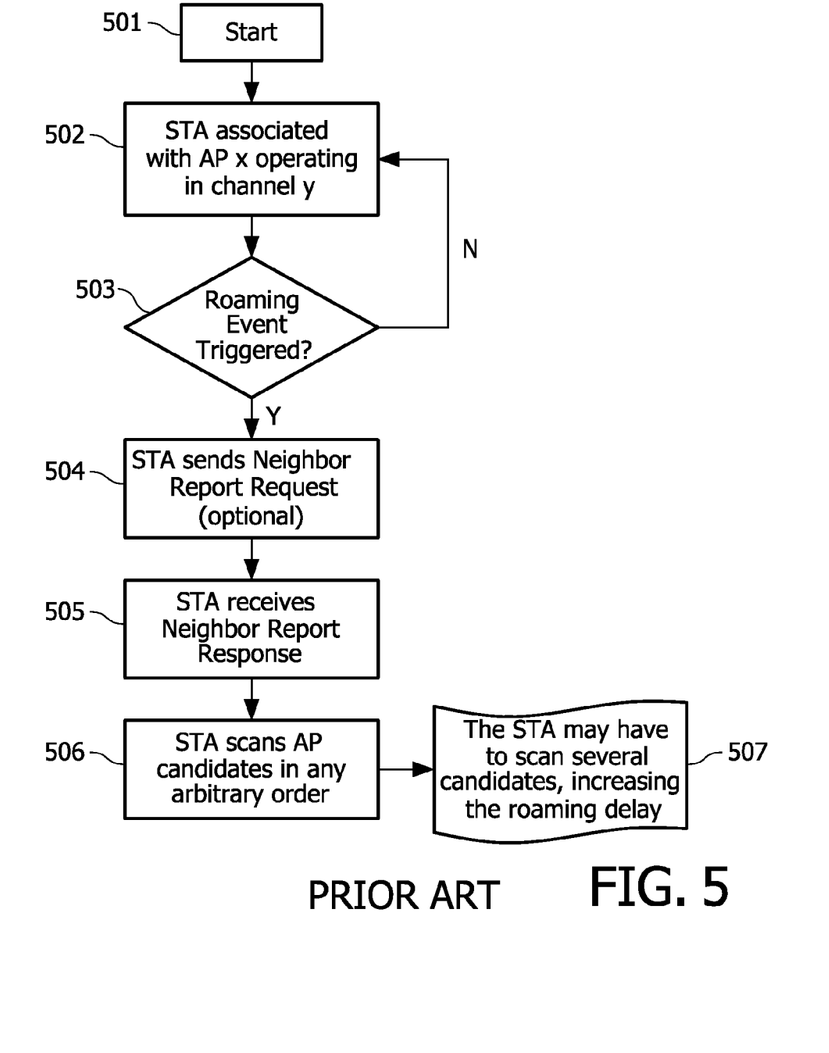
FIG. 5 illustrates a prior art roaming candidate AP scan method.
Figure 6:
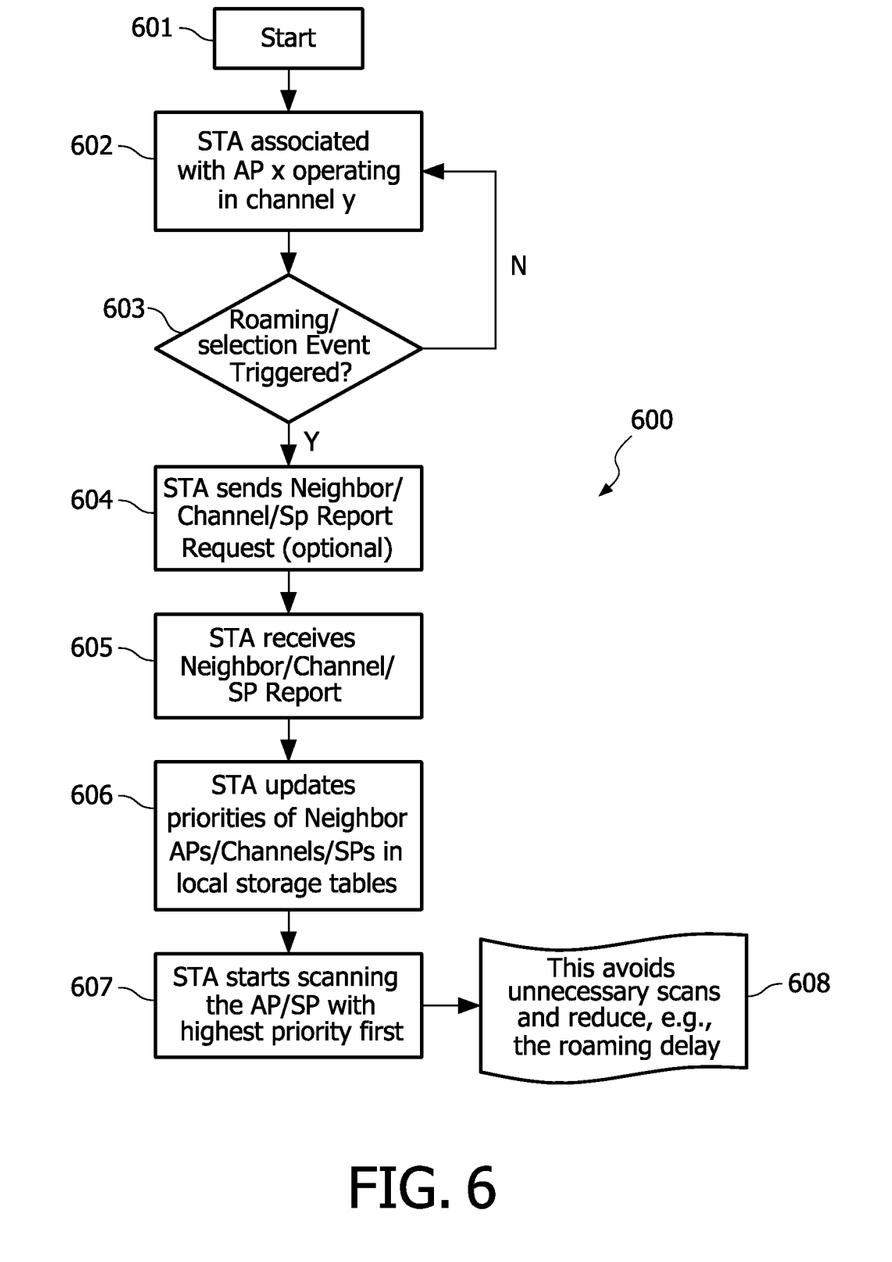
FIG. 6 illustrates the roaming candidate AP scan method of FIG. 4, modified according to the present invention.

FIG. 5 and FIG. 6 respectively illustrate the scan process according to the current state of the art and using the priority field of the first preferred embodiment and its alternatives.

Referring now to FIG. 5, in the prior art when a roaming event is triggered 503 a STA requests a neighbor report at step 504 and/or receives a neighbor report at step 505 and then scans AP candidates reflected in these reports in arbitrary order at step 506. As a result of having no other information concerning the priority of candidate APs the STA may have to scan several candidates, increasing the roaming delay at step 507.

Referring now to FIG. 6, neighbor, channel, and SP reports received by a STA reflect an AP assessment of candidate AP and SP priority according to a preferred method of the present invention. The AP respectively computes the "Priority" field 103.6 154.2 203.*i*.2 231 for each neighbor AP, channel, or SP using any of a plurality of different decision rules that take into consideration a plurality of pre-determined decision parameters. In a preferred embodiment, one such decision/performance parameter is that the AP obtains location information of the STAs, e.g., using the functionalities defined in 802.11k, and uses each STA's location information in combination with the location of the other APs to compute the relative priorities of all the APs according to a pre-determined decision rules such as ordering the APs by distance from the STA. Alternatively, a decision/performance parameter such as traffic load at each neighbor AP, which can be obtained through the wired network, and decision/requirement parameters such as the QoS requirements of the STA, are together taken into consideration as decision parameters and used in a pre-determined decision rule when assigning priorities to the APs. At step 603 a roaming/information-requiring event is triggered and the STA optionally requests a neighbor/channel report/SP at step 604. At step 605 the STA receives a neighbor/channel/SP report and updates its locally stored table(s) 300 350 400 that include priorities. Then, given a local table ordered by priorities (e.g., by an index or storing the table as a linked list in order of priorities) the STA scans the table(s) from highest to lowest priority at step 607 and thus avoids unnecessary scans thereby reducing roaming/selection delay at step 608.

Figure 7A:
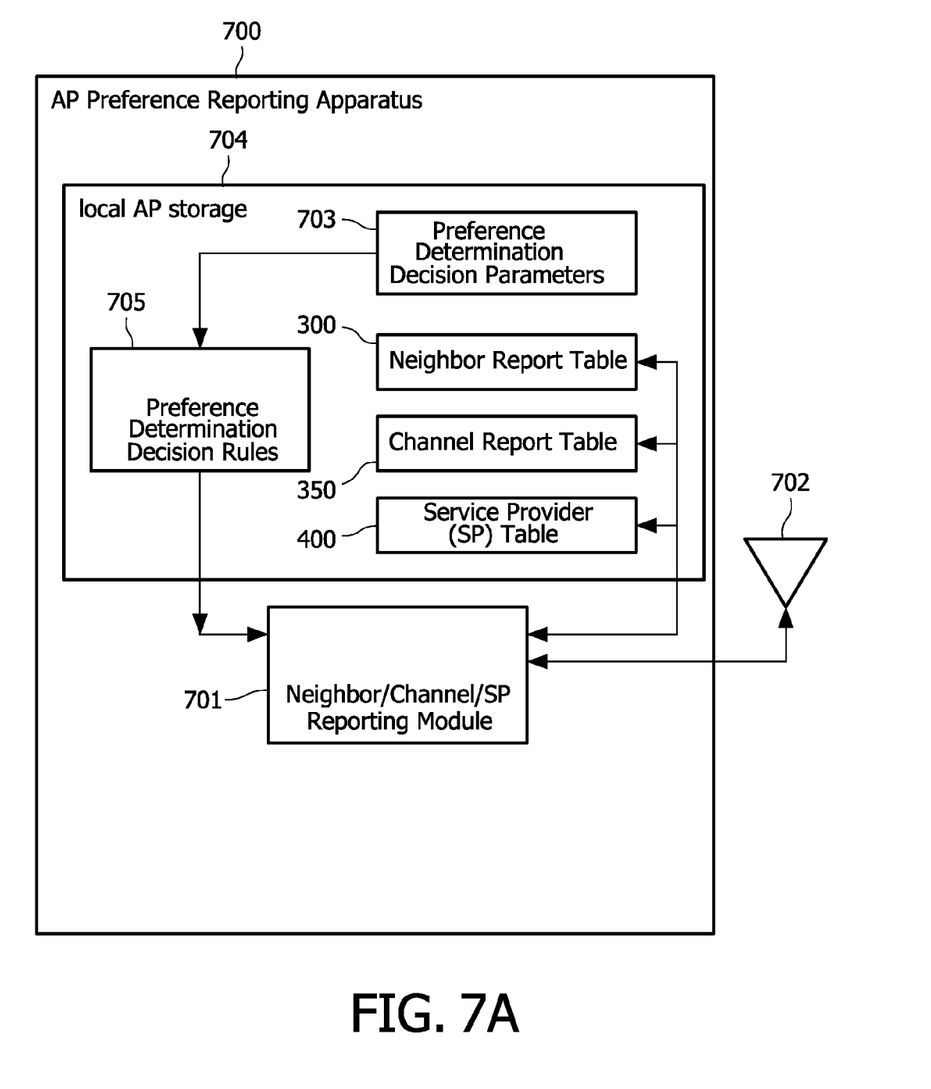
FIG. 7A illustrates an AP roaming apparatus according to the present invention.

As illustrated in FIG. 7A, an AP preference reporting apparatus 700 used to modify an AP to perform reporting in accordance with the present invention includes the aforementioned local storage including at least one of a neighbor report table 300, a channel report table 350, and an SP table that is operably connected to and accessed/updated/maintained by a neighbor/channel/SP reporting module 701. Additionally, preference determination decision parameters 703 which can include truth values (T/F), tolerance values, etc., and rules 705 that employ the parameters 703 are included and used by the AP to determine the priorities. The neighbor/channel/SP reporting module 701 receives requests for reports from STAs (as in steps 504 and 604) and/or periodically senses the medium via AP antenna 702, maintains its local tables 300 350 and sends reports via antenna 702 to STAs within radio range of the AP. It is to be noted that the AP can also be a base station and a central controller, see FIG. 8 components 801$_i$. The focus in this disclosure on an AP is by way of providing an example only and does not limit the invention thereto.

Figure 7B:
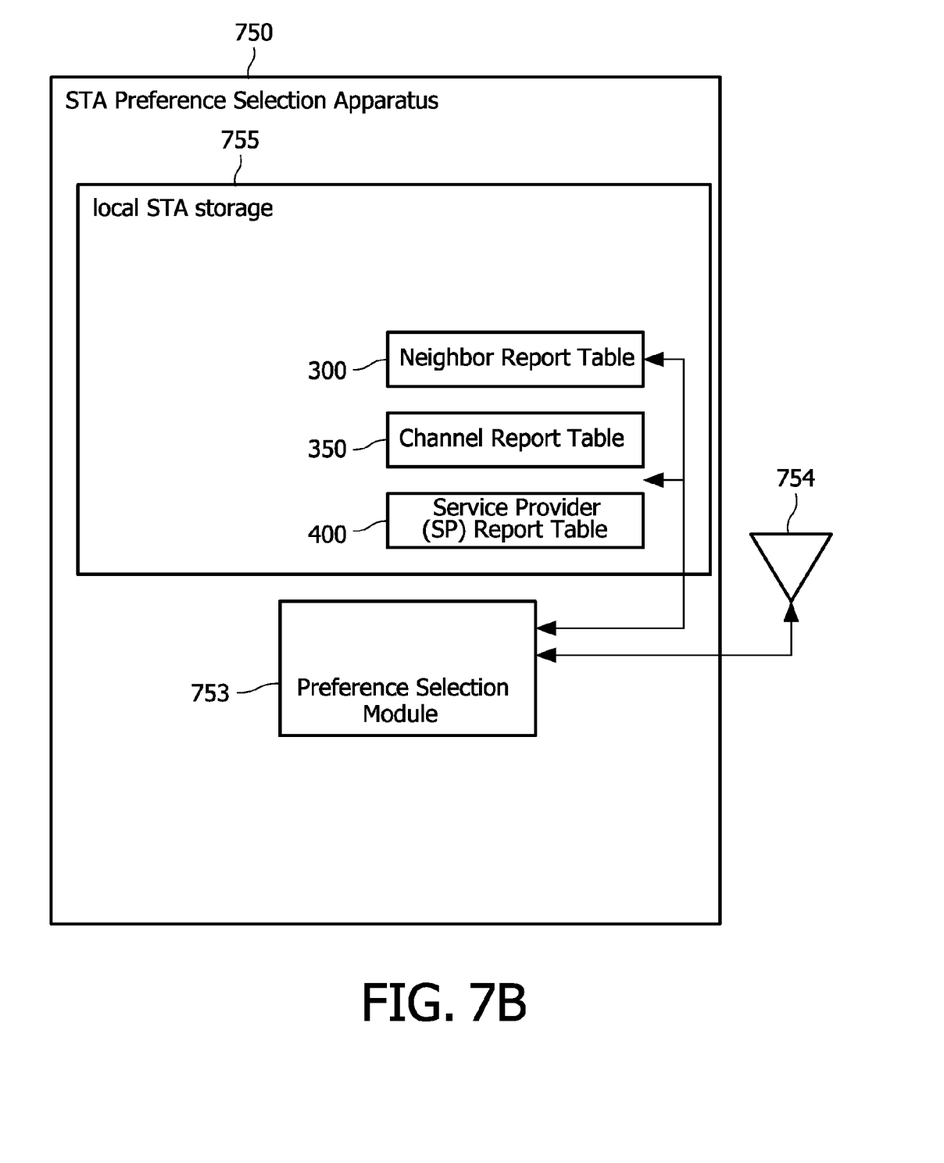
FIG. 7B illustrates a STA roaming apparatus according to the present invention.

FIG. 7B illustrates a STA preference selection apparatus 750, i.e., an AP candidate selection apparatus with which to modify a STA according to the present invention. The STA preference selection apparatus comprises a local storage (755) for neighbor reports 300, channel reports 350, and SP reports 400 received by the STA, a preference selection module operably connected to an antenna 754 of the STA to perform at least one of request/receive reports and to the local STA storage which is illustrated as a neighbor table 300, a channel report table 350, and an SP table, as in FIGS. 3A-B and 4, respectively, but this is by way of an example only and is not intended to limit the format/content of such local STA report storage. It is meant to represent a required minimum storage content but not a format. A linked list is possible as is an unordered list indexed in priority order by a separate index. Other storage formats are possible. The STA (can be a cell phone) preference selection apparatus 750 controls the preference selection module 753 to receive/request reports (see steps 605/604 of FIG. 6) and store/update/maintain (see step 606 of FIG. 6) the local storage tables 300 350 400 and to scan these tables 300 350 400 (see step 607 of FIG. 6) in an order recommended by the priority fields of said tables and select an AP for at least one of roaming and provision of service by an SP, e.g., whenever a roaming event is triggered (see step 603 of FIG. 6). It is to be noted that the STA can be any mobile station that roams, see FIG. 8 components 803$_i$. The focus in this disclosure on a STA (IEEE 802.11 WLAN STA) is by way of providing an example only and does not limit the invention thereto.

Figure 8:
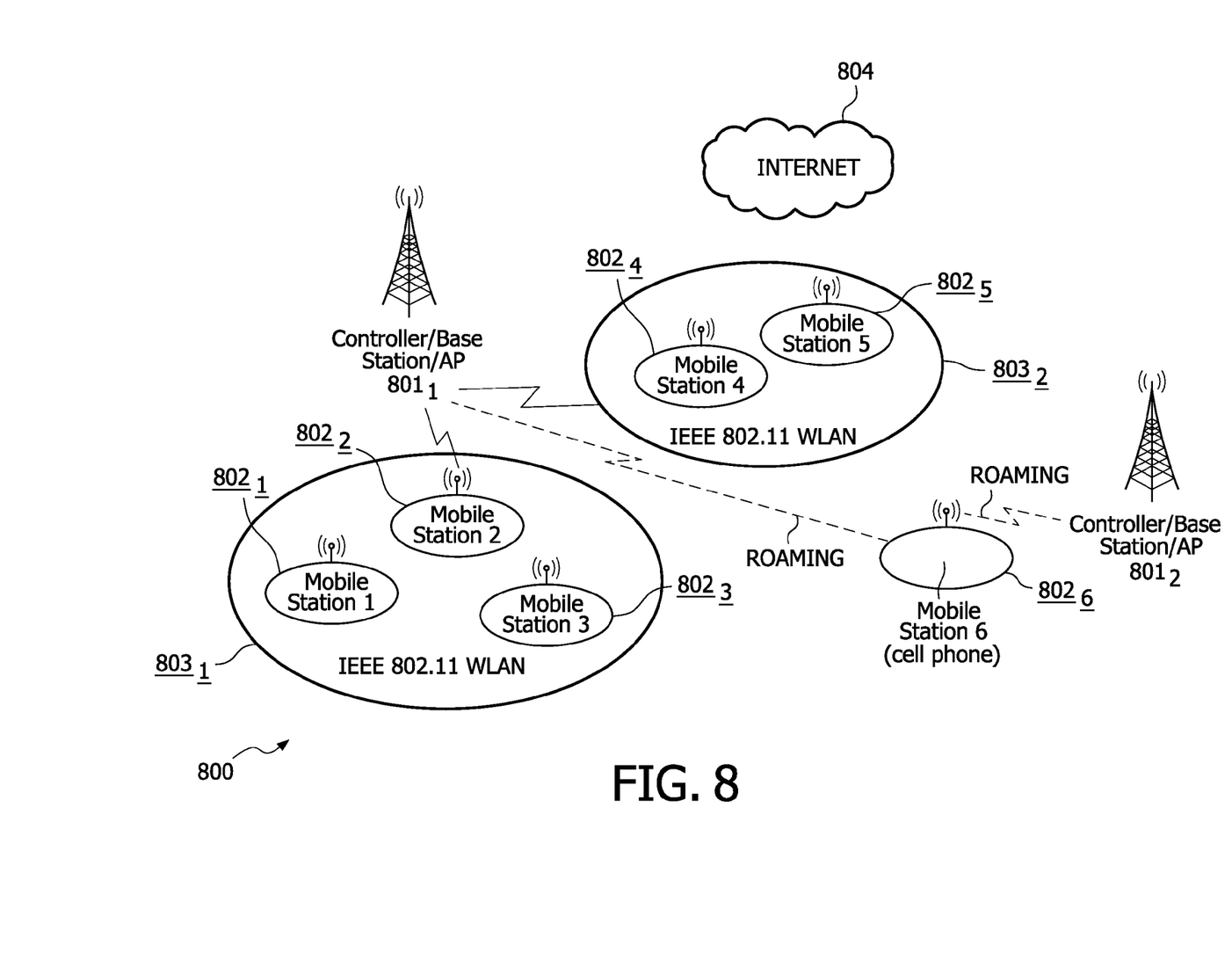
FIG. 8 illustrates a system for roaming between networks that support any wireless standard in which a mobile station (STA) roams from one AP/base stations/central controller to another, according to the present invention.

In all embodiments of the present invention, the preference included in a report indicates the order in which the STA should scan the reported neighbor AP (801$_i$)/neighbor AP channel/SP or directly attempt to associate with the AP (801$_i$)/SP without any further scanning. The reports have to somehow be placed in this order and scanned in this order so that the associated neighbor APs (801$_i$)/neighbor AP channels/SPs can be scanned or directly associated with in this recommended order.

This invention is applicable for IEEE 802.11 ICs, products and equipment.

This invention is applicable to any wireless standard in which a mobile station roams from one AP/base station/central controller to another.

This invention can also be used for roaming between different networks, which is called vertical handoff, see cell phone component 802$_6$ of FIG. 8.

While, several embodiments of the present invention have been illustrated and described, one skilled in the art will understand that changes may be made in these embodiments without departing from the principles and spirit of the present invention, the scope of which is defined in the appended claims and their equivalents. For example, a person skilled in the art could use the concept of 'priority' but name the field differently. For example, 'preference', 'order', and 'match' can be substituted for 'priority' without departing from the spirit and scope of the invention as defined in the appended claims and their equivalents.

The invention claimed is:

1. A wireless network system for prioritizing by an AP access points (APs) for preferred connectivity thereto by a station (STA), comprising:
    at least one AP comprising an AP preference reporting apparatus configured to include a reporting module, said reporting module being configured to transmit information reported by the at least one AP in at least one transmitted preference report, the preference report including connectivity preferences for at least one AP and at least one service provider (SP); and
    the STA comprising a STA preference selection apparatus configured to include a preference selection module to receive the at least one transmitted preference report and select an AP and an SP for connectivity thereto based on the at least one received preference report.

2. The system of claim 1, wherein the at least one preference report includes a priority field selected from the group consisting of priority for each reported AP and SP and priority for a plurality of reported APs and SPs.

3. The system of claim 2, wherein the priority field contains a priority indicator selected from the group consisting of a numeric value and a symbolic value such that the priority indicator indicates a recommendation from the AP concerning the order to perform a procedure using the at least one received preference report, for determination by the STA to connect to one reported AP and one reported SP.

4. The system of claim 3, wherein for each preference report the procedure further comprises one of a scan of the at least one AP and the at least one SP based on the at least one received preference report and a direct attempt to associate with the selected AP and SP without any further scanning.

5. The system of claim 4, wherein the AP generates a priority indicator for selection of an SP based on at least one predetermined decision parameter that affects at least one of cost and quality of connection of the STA to a reported SP.

6. The system of claim 5, wherein the at least one predetermined decision parameter includes at least one parameter selected from the group consisting of:
    costs to the STA of connection to the reported SP,
    costs to the AP of connection of the STA to the reported SP,
    level of integration of AP services with services supported by the reported SP,
    priority assigned to network traffic coming from and going to the reported SP,
    priority assigned by the AP to honor a request for connection of the STA to the reported SP,
    number and types of services offered to the STA when connected to the reported SP, and
    business contract between the AP and the reported SP.

7. The system of claim 6, wherein the AP generates a priority indicator for a neighbor AP or a neighbor AP channel that determines an order for the STA to use AP preference reports in an eventual roaming process, said order being based on at least one predetermined decision parameter that affects at least one of cost and quality of a roaming connection of the STA to a reported neighbor AP.

8. The system of claim 3, wherein the AP generates a priority indicator for a neighbor AP or a neighbor AP channel that determines an order for the STA to use AP preference reports in an eventual roaming process, said order being based on at least one predetermined decision parameter that affects at least one of cost and quality of a roaming connection of the STA to a reported neighbor AP.

9. The system of claim 8, wherein for each AP preference report the eventual roaming process further comprises one of a scan of the neighbor AP or the neighbor AP channel based on the at least one received preference report and a direct attempt to associate with the AP without any further scanning.

10. An access point (AP) preference reporting apparatus, comprising:
a local AP storage comprising:
a plurality of preference determination decision parameters and a plurality of preference determination decision rules that reference the preference determination decision parameters,
a neighbor report table and a channel report table for storing priority information about AP candidates,
an SP report table for storing priority information about service provider (SP) candidates; and
a reporting module operably connected to an antenna of the AP to receive and request preference reports, and the local AP storage for storage of received preference reports in the neighbor table, the channel report table, and the SP report table, the preference reports each including connectivity preferences for at least one AP and at least one SP, and
wherein, the reporting module is configured to receive preference report requests and scan the neighbor APs via one of the antenna, a distributed system and a wired network to obtain measurements thereof, create and store preference reports in the appropriate one of the neighbor report table, channel report table and SP table by using the preference determination decision rules that reference the preference determination decision parameters to assign each measurement a priority for selecting for connectivity an AP and an SP, and sends each preference report via AP antenna.

11. The apparatus of claim 10, wherein the preference reports include a priority field selected from the group consisting of a priority field for each reported AP and SP and a priority field for a plurality of reported APs and SPs.

12. The apparatus of claim 11, wherein the priority field contains at least one priority indicator selected from the group consisting of a numeric value and a symbolic value such that the priority indicator indicates a recommendation concerning the order for a STA to use the transmitted preference reports, for determination by the STA to connect to a reported AP and a reported SP.

13. The apparatus of claim 12, wherein for each preference report the at least one priority indicator further indicates a recommendation concerning the order for the STA to perform one of a scan of the at least one AP and the at least one SP of the preference report and a direct attempt to associate with the at least one AP and the at least one SP of the preference report without any further scanning.

14. The apparatus of claim 13, wherein the preference report for a neighbor AP, a neighbor AP channel, and an SP is respectively a neighbor AP report element having a variable number of neighbor AP list entries, an AP channel report element having a variable number of AP channel list entries, and an SP information element included in any protocol frame transmitted by the AP that contains information about one or more SPs that it supports, said SP information element having a variable number of SP information.

15. The apparatus of claim 13, wherein the preference report for a neighbor AP and a neighbor AP channel is respectively a neighbor AP report element having a variable number of neighbor AP list entries, an AP channel report element having a variable number of AP channel list entries.

16. A method for prioritizing access points (APs) by an AP for preferred connectivity thereto by a station (STA) in a wireless network, comprising:
transmitting, by an AP, preference reports including connectivity preferences of the AP for at least one AP and at least one service provider (SP);
receiving, by a STA the at least one transmitted preference report;
performing, by the STA, one of scanning of and directly connecting to the at least one AP and the at least one SP of a received preference report in accordance with the connectivity preferences of the AP; and
when the scanning is performed, selecting by the STA an AP and an SP for connectivity thereto based on the scanned at least one AP and the scanned at least one SP.

17. The method of claim 16, further comprising the AP indicating in an included priority field in the at least one received preference report, a recommendation from the AP concerning the order for the STA to perform the scanning for determination by the STA to connect to at least one reported AP and at least one reported SP, said priority indicator being selected from the group consisting of a numeric value and a symbolic value.

18. The method of claim 17, further comprising including in the priority field a priority indicator selected from the group consisting of priority for each reported AP and SP and priority for a plurality of reported APs and SPs.

19. The method of claim 18, further comprising selecting a priority indicator by an AP for an SP based on at least one predetermined decision parameter that affects at least one of cost and quality of connection of the STA to a reported SP.

20. The method of claim 19, wherein the at least one predetermined decision parameter includes at least one parameter selected from the group consisting of:
costs to the STA of connection to the reported SP,
costs to the AP of connection of the STA to the reported SP,
level of integration of AP services with services of the reported SP,
priority assigned to network traffic coming from and going to the reported SP,
priority assigned by the AP to honor a request for connection of the STA to the reported SP,
number and types of services offered to the STA when connected to the reported SP, and
business contract between the AP and the reported SP.

* * * * *